3,312,067
JET PROPULSION UNIT
René Marcel Benquet, Saint-Mont, Gers, France
Filed Feb. 28, 1964, Ser. No. 348,138
Claims priority, application France, Mar. 4, 1963,
927,432
2 Claims. (Cl. 60—246)

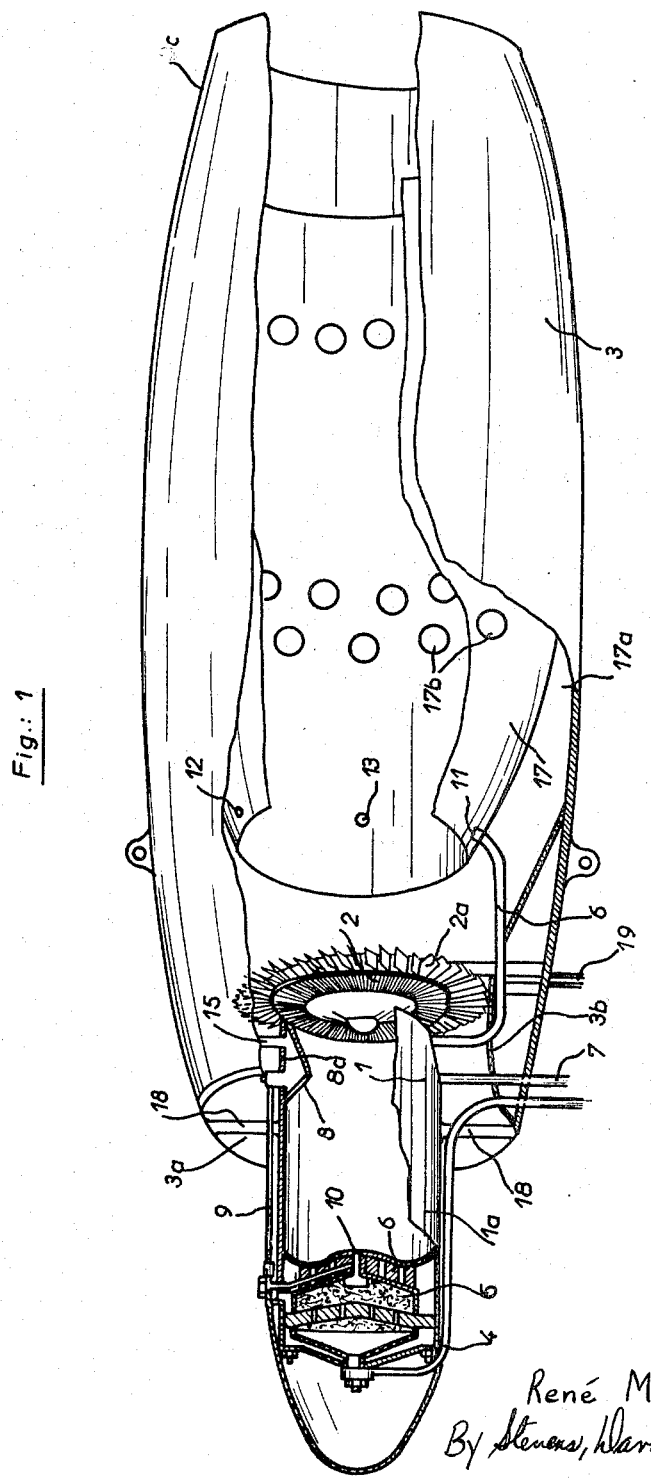

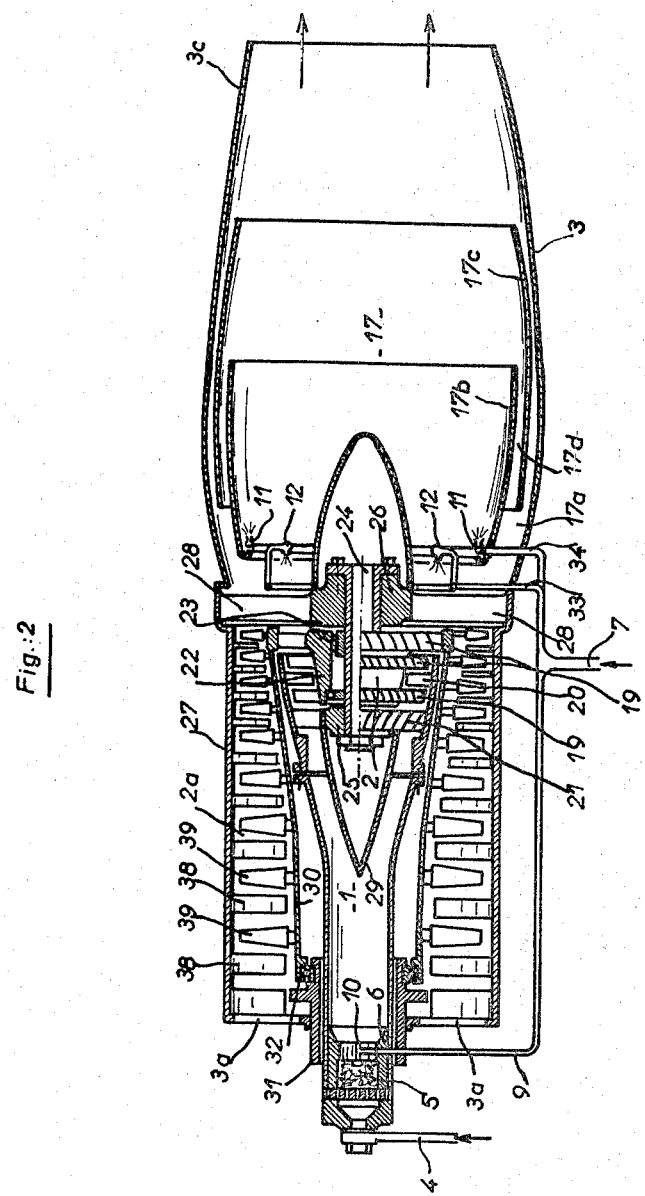
Fig.:2

This invention relates to a jet propulsion unit. Liquid-fuel or solid-fuel rocket-jet engine assemblies have been used for many years. They have the advantage of having a very simple structure since it is reduced to a combustion chamber and a discharge nozzle, and of providing a force or thrust which is limited only by the delivery rates of the liquids which are supplied to such assemblies.

On the other hand they have the great disadvantage of having an extremely high rate of consumption, which makes their use prohibitive or limits it to some space-travel devices. Its specific thrust, which may be on an average of about 250 kg., means that its consumption as compared with that of a turbo-jet engine is almost 15 times higher. The present invention is concerned with an apparatus whereby the efficiency of the rocket-jet engine assembly can be improved.

According to the invention there is provided a jet propulsion unit comprising combination of a rocket with an air-breathing jet engine, the rocket ejecting its gases into the air-breathing jet engine through means whereby the mass and the pressure of the air admitted into the engine can be increased.

According to a first embodiment of the invention the air-breathing jet engine is a ram-jet and the rocket jet ejects its gases directly into the ram-jet which has a convergent intake designed so that the gases ejected from the rocket into said intake introduce and compress a considerable volume of air by an injector effect.

In another embodiment the gases from the rocket jet-engine rotate a turbine driving an air-compressor which makes it possible to obtain an intake of air under high pressure into the air-breathing jet engine, ensuring the best possible output for the latter.

FIGURES 1 and 2 of the drawings show diagrammatically two embodiments of the invention.

The apparatus shown in FIG. 1 essentially comprises the combination of two discharge nozzles connected by a turbo-compressor.

One discharge nozzle 1 operates as a liquid-fuel rocket jet engine whose jet drives a turbine 2 driving a compressor 2a which supplies the air-breathing jet engine 3 under high pressure, the engine thus receiving the jet of the rocket jet-engine and at the same time a large quantity of air, which permits dilution and combustion at a high rate of thermal efficiency of the fuel injected into the air-breathing engine.

In the embodiment shown in FIG. 1, the discharge nozzle 1 of the rocket jet-engine is supplied with hydrogen peroxide and kerosene. The hydrogen peroxide is supplied under high pressure through the supply pipe 4 and passes through a platinum sponge 5 serving as a catalyst and the retaining grid 6 for the catalyst.

The expansion occurring as a result of the dissociation of the hydrogen peroxide in contact with the catalyst is effected in the chamber 1a preceding the discharge nozzle 1. The fuel (kerosene) is supplied under high pressure through the pipe 7 into jacket 8a surrounding the convergent-divergent part 8 of the nozzle 1 and serving as a collector and heater. The heated fuel is supplied through the pipe 9 to the injector 10. The kerosene ignites spontaneously in contact with the oxygen resulting from the dissociation of the hydrogen peroxide.

The thrust produced by the gases issuing at high speed from the discharge nozzle 1 and actuating the turbine 2 driving the compresor 2a, which is intended to effect the maximum compression possible of the air, entering at 3a the convergent-divergent intake 3b of the ram-jet 3, so as to give the best possible efficiency to the combustion chamber 17 of the ram-jet 3. The compressor 2a provides a very considerable air flow, which ensures an extensive dilution of the gases of the rocket and permits the burning of kerosene distributed by injectors 11, 12, 13 and 14 which are arranged on the periphery of the combustion chamber 17 of the ram-jet 3. The number of these injectors and their rate of delivery may vary in accordance with the size of the thrust required.

The kerosene is distributed to these injectors by pipes 15 and 16 which start from the jacket of the convergent-divergent part 8. The wall of the combustion chamber 17 of the ram-jet 3 is at a distance from the outer wall of said ram-jet so as to provide an interval 17a within which circulates fresh air which is distributed tangentially into the combustion chamber by appropriate apertures 17b protecting the outer wall from contact with the flame and excessively high temperatures. The walls of the rocket and of the air-breathing engine are connected by narrow arms 18. A shaft driven by the turbine 2 with a power take-off 19 makes it possible to operate various accessories.

Thus, the ram-jet 3 is supplied with fresh air under high pressure by the compressor 2a and at the same time receives the gases of the rocket, particularly the oxygen liberated by the dissociation of the hydrogen peroxide which has intentionally not been burned in the rocket so as not to exceed the limit temperatures permitted by the turbine. The great volume of gas produced by combustion in the ram-jet engine gives a very considerable thrust, substantially improving the output of the rocket. The rocket can also be designed to operate with other catalysts and other propellants.

The hydrogen peroxide has the advantage that it can be used either alone for supplying the energy or for burning an appropriate fuel. When the hydrogen peroxide with a concentration of 80 to 85% is brought into contact with a catalyst, which may be solid, for example platinum sponge, or liquid, for example sodium or potassium permanganate, it is dissociated and thereby produces a mixture of about 44% of oxygen and 56% of steam at a temperature in the region of 500° C. Its expansion can produce the energy necessary for actuating the turbine. It is sufficient to provide for the supply of hydrogen peroxide to be suitable for the power which the turbine has to supply.

If a fuel such as kerosene is introduced into the combustion chamber 1a of the rocket in the proportion of $\frac{1}{20}$ of the hydrogen peroxide introduced, only a part of the oxygen released is burnt and a combustion temperature of the order of 900 to 1000° C. is obtained. The rate of flow of the fuel can be controlled so that the temperature is not harmful to the turbine. The remainder of the oxygen which passes through the turbine can serve to assure the combustion of the fuel admitted into the "air-breathing engine." It is to be pointed out that if one of the kerosene injectors in the air-breathing engine opens directly upstream of the turbine wheel, the kerosene admitted through this injector is ignited directly in contact with the oxygen originating from the liberation of the hydrogen peroxide, which can serve to start the combustion and to stabilize the flame in the air-breathing engine, this being an important advantage.

FIGURE 2 shows an improved embodiment.

Turbine 2 comprises three movable wheels 19 of which the first two are separated by a ring of stationary blades 20 and preceded by stationary guide blades 21. The wheels 19 are fast with a rotor 22 which rotates about a fixed shaft 24 by means of roller bearings 23. This shaft 24 is supported, on the one hand, by the central hub 25 of the stationary guide ring 21 which has its periphery integral with the outer casing of the rocket 1 and, on the other hand, by a hub 26 connected to the stator 27 of the compressor 2a by radial arms 28. A cone 29 secured to the front of the stationary hub 25 conducts the rocket gases towards the guide ring 21 and then towards the turbine wheels which are thus driven in rotation by these gases which exhaust from the turbine through the gap between the radial arms 28, so as to enter the combustion chamber 17 of the air-breathing engine which ends with the final exhaust nozzle 3c.

The air compressor 2a is illustrated as being of the multistage axial type. Air is sucked into this compressor at 3a and traverses successively the stationary blades 38 and the wheels 39 so as to be raised to a high pressure level when it issues from the compressor between the radial arms 28 to enter the combustion chamber 17.

The movable wheels 39 of the compressor are carried by a tubular support 30 which is fast, at one of its ends (right-hand end on FIG. 2) with the rotor 22 of the turbine, through the last wheel 19 thereof and which, at its opposite end, is carried by a stationary tubular hub 31, through a bearing 32.

It will be appreciated that this rational arrangement allows for obtaining a good centering and a good drive of the compressor rotor, while restricting the location of the rocket, turbine and compressor to a minimum of space.

As described above, the whole of the combustion chamber 17 which receives pressurized air from the compressor, is spaced from the outer wall 3 of the air-breathing engine by an interval 17a. This interval also receives a fraction of the air for cooling the wall 3. The said wall of the combustion chamber 17 may moreover itself be subdivided into two walls 17b and 17c spaced by an interval 17d for the admission of secondary air into the combustion chamber. The fuel is supplied thereto through injectors 11, 12 which discharge fuel along the flow direction as at 11 or in counter-flow direction as at 12. These injectors are connected with rings fed by pipes 33–34 from the pipe 7 which also feeds through 9 the injector 10 of the rocket. The latter receives hydrogen peroxide through the pipe 4, and already described in connection with FIG. 1.

The operation is the same as in the previously described embodiment, but it is here possible to use a high power turbine and compressor for designing a composite engine capable of developing a high thrust.

What I claim is:

1. A jet propulsion unit comprising the combination of a rocket, means for supplying to said rocket a medium adapted to generate hot gases in said rocket, a turbine comprising at least one movable wheel and a ring of stationary blades, the inlet of said turbine being connected to the outlet of said rocket whereby said wheel is driven by the gases issuing from said rocket, an axial compressor which sucks atmospheric air and which comprises several movable wheels in series, a tubular support for said wheels extending around said turbine and said rocket, means for carrying said support for rotation, said support being further fast with the periphery of a turbine wheel, the outlets from the compressor and turbine being concentric, a combustion chamber extending to the rear of the outlets of the compressor and turbine whereby said chamber is fed both with the rocket gases having performed work through the turbine and with pressurized air discharged by the compressor, means for injecting fuel into said chamber, and a jet propulsion nozzle extending to the rear of said chamber.

2. A jet propulsion unit as claimed in claim 1 wherein said means for supplying said medium to said rocket is a chamber filled with a catalyst capable of decomposing hydrogen peroxide into water and oxygen and a source of hydrogen peroxide.

References Cited by the Examiner
UNITED STATES PATENTS

| | | | |
|---|---|---|---|
| 2,857,740 | 10/1958 | Hall et al. | 60—35.6 |
| 2,979,892 | 4/1961 | Chamberlin et al. | 60—35.6 |
| 3,040,521 | 6/1962 | Broughton et al. | 60—35.6 |
| 3,110,153 | 11/1963 | House | 60—35.6 |
| 3,111,005 | 11/1963 | Howell et al. | 60—35.6 |

MARK NEWMAN, *Primary Examiner.*

D. HART, *Assistant Examiner.*